United States Patent
Boeda et al.

(10) Patent No.: US 10,529,333 B2
(45) Date of Patent: Jan. 7, 2020

(54) COMMAND PROCESSING PROGRAM, IMAGE COMMAND PROCESSING APPARATUS, AND IMAGE COMMAND PROCESSING METHOD

(71) Applicant: KABUSHIKI KAISHA SQUARE ENIX, Tokyo (JP)

(72) Inventors: Gautier Boeda, Tokyo (JP); Eric Johnson, Tokyo (JP); Remi Driancourt, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

(21) Appl. No.: 15/956,210

(22) Filed: Apr. 18, 2018

(65) Prior Publication Data

US 2019/0103106 A1    Apr. 4, 2019

(30) Foreign Application Priority Data

Oct. 3, 2017   (JP) ................. 2017-193354

(51) Int. Cl.
    *G10L 15/22*   (2006.01)
    *G10L 15/26*   (2006.01)
    *G06F 17/27*   (2006.01)
    *G06T 19/00*   (2011.01)
    (Continued)

(52) U.S. Cl.
    CPC ............ *G10L 15/22* (2013.01); *G06F 17/271* (2013.01); *G06F 17/28* (2013.01); *G06T 15/20* (2013.01);
    (Continued)

(58) Field of Classification Search
    CPC ...................................... G10L 15/22
    (Continued)

(56) References Cited

U.S. PATENT DOCUMENTS

2014/0195918 A1    7/2014   Friedlander

FOREIGN PATENT DOCUMENTS

| JP | 04-306769 | 10/1992 |
|----|-----------|---------|
| JP | 2000-231427 | 8/2000 |

(Continued)

OTHER PUBLICATIONS

Office Action from Japan Patent Office (JPO) in Japanese Patent Appl. No. 2017-193354, dated Oct. 9, 2018, together with a partial English language translation.

(Continued)

*Primary Examiner* — Susan I McFadden
(74) *Attorney, Agent, or Firm* — Greenblum & Bernstein, P.L.C.

(57) ABSTRACT

A non-transitory computer-readable medium including a command processing program for causing a computer to realize functions to generate a command for carrying out an indication against an operation target in a virtual space on the basis of an input by a user using a natural language is provided. The functions include: a text data obtaining function configured to obtain text data on the basis of the input by the user using the natural language; a syntax analyzing function configured to extract a command from the obtained text data, the user wanting to carry out the command; a command analyzing function configured to generate a primitive type command from the command extracted by the syntax analyzing function; and a specific viewpoint information obtaining function configured to obtain specific viewpoint information at least at a time of an input operation by the user using the natural language.

10 Claims, 7 Drawing Sheets

(51) Int. Cl.
    *G06T 15/20* (2011.01)
    *G06F 17/28* (2006.01)
    *G06F 3/16* (2006.01)
(52) U.S. Cl.
    CPC ............ *G06T 19/006* (2013.01); *G10L 15/26* (2013.01); *G06F 3/167* (2013.01); *G10L 2015/223* (2013.01)
(58) Field of Classification Search
    USPC ........................................................ 704/275
    See application file for complete search history.

(56) References Cited

FOREIGN PATENT DOCUMENTS

| JP | 2013-134430 | 7/2013 |
|---|---|---|
| JP | 2014-132459 | 7/2014 |
| JP | 2017-156511 | 9/2017 |

OTHER PUBLICATIONS

Hozumi Tanaka et al., "Action Control by Interaction with Agent in Virtual Space, Language Understanding and Action Control", Mar. 2003, pp. 67-70, [online], [Search on Sep. 25, 2018], URL, http://citeseerx.ist.psu.edu/viewdoc/download?doi=10.1.1.102.6022&rep=rep1&type=pdf, together with an English language transaltion.

Hozumi Tanaka, "Language Understanding graphics and Action Control-Integration of speech recognition • language understanding • computer graphics technology-", IEICE Technical Report vol. 104 No. 417, Japan, The Institute of Electronics, Information and Communication Engineers, Oct. 29, 2604, pp. 19-24.

Office Action from Japan Patent Office (JPO) in Japanese Patent Appl. No. 2017-193354, dated Jul. 23, 2019, together with an English language translation.

COMMAND PROCESSING PROGRAM, IMAGE COMMAND PROCESSING APPARATUS, AND IMAGE COMMAND PROCESSING METHOD

CROSS-REFERENCE TO RELATED APPLICATION

The present application relates to subject matter contained in Japanese Patent Application No. 2017-193354 field on Oct. 3, 2017, the disclosure of which is expressly incorporated herein by reference in its entirety.

BACKGROUND OF THE INVENTION

1. Field of the Invention

At least one of embodiments according to the present invention relates to a command processing program, an image command processing apparatus, and an image command processing method for causing an operation target in a virtual space to carry out an instruction by means of an input by natural language such as a voice input.

2. Description of the Related Art

Heretofore, command processing to recognize an input from a user by his or her voice by means of voice recognition processing and to input an instruction against an indication target has been carried out. Both in the case of such a voice input and in the case of a text input without a voice, it is necessary to deal with natural language in a process side that receives the instruction.

In a case where a natural language is inputted, for example, an ambiguous expression such as "there" or "yonder" may be made as words for indicating a location. It is necessary to appropriately deal with ambiguity of these words. Further, even in a case where a plurality of objects of a command exists and the inputted natural language is one based on expression of words by which one object cannot be specified uniquely, it is necessary to carry out a process to appropriately select the object specified by the command among the plurality of objects.

As a technique to deal with such an ambiguous expression, Japanese Patent Application Publication No. 2013-134430 (hereinafter, referred to as "Patent Document 1") may be cited, for example. Patent Document 1 discloses a method of dealing with an ambiguous expression by replacing the ambiguous expression with a similar expression. Further, as a technique to deal with the case where a plurality of objects exists, Japanese Patent Application Publication No. H04-306769 (hereinafter, referred to as "Patent Document 2") may be cited, for example. Patent Document 2 discloses that, in a case where a plurality of objects is exists, identification of an object that becomes an indication target is carried out by using relative distance relationship of the objects.

Here, there is needs for a user to cause an operation target controlled by a computer to carry out instruction content on a virtual space in a video game or the like by inputting an instruction with natural language. For example, like an FPS (First Person shooter: which is a video game in which a game screen is configured so that a user can arbitrarily move within a virtual space of the video game on the basis of a user's viewpoint.) and the like, in a case where progress of a video game in a virtual space is controlled on the basis of a viewpoint of a user, there is needs that the user wants to be allowed to instruct a non-player character or the like as a target of computer control in the virtual space with a voice. The user wants to carry out a voice input with a feeling of daily conversation. However, in a case where a plurality of targets exists and one of them is to be specified accurately, or in a case where it is in a situation that a target cannot be specified by only an ambiguous expression, an instruction by the voice input of the user cannot be carry out, and it is necessary to input the instruction again by producing a sound of the voice input. For this reason, there is a fear that a sense of immersion to the video game is damaged. According to Patent Documents 1 and 2, it is possible to exhibit the effects in processing of natural language in a specific situation. However, it has been desirable a command processing program and the like capable of command processing even though the voice input is carried out with a feeling of daily conversation under various situations in addition to the specific situation.

SUMMARY OF THE INVENTION

It is an object of at least one of embodiments according to the present invention to solve the problem described above, and to provide a command processing program, an image command processing apparatus, and an image command processing method capable of appropriately carrying out command processing even though a voice input is carried out with a feeling of daily conversation in which ambiguous expressions are contained.

According to one non-limiting aspect of the present invention, there is provided a non-transitory computer-readable medium including a command processing program for causing a computer to realize functions to generate a command for carrying out an indication against an operation target in a virtual space on the basis of an input by a user using a natural language.

The functions include a text data obtaining function configured to obtain text data on the basis of the input by the user using the natural language.

The functions also include a syntax analyzing function configured to extract a command from the obtained text data, the user wanting to carry out the command.

The functions also include a command analyzing function configured to generate a primitive type command from the command extracted by the syntax analyzing function.

The functions also include a specific viewpoint information obtaining function configured to obtain specific viewpoint information at least at a time of an input operation by the user using the natural language, the specific viewpoint information indicating a specific viewpoint in the virtual space.

The functions also include a command evaluating function configured to evaluate, in a case where the primitive type command generated by the command analyzing function includes a plurality of choices, each of the choices on the basis of a predetermined evaluation standard to output an evaluation result.

The functions also include a command determining function configured to determine a choice on the basis of the evaluation result by the command evaluating function to determine a command. In this case, the command evaluating function includes a function configured to evaluate each of the choices in the primitive type command by using the specific viewpoint information obtained by the specific viewpoint information obtaining function.

According to another non-limiting aspect of the present invention, there is provided a command processing apparatus provided with functions to generate a command for carrying out an indication against an operation target in a virtual space on the basis of an input by a user using a natural language.

The command processing apparatus includes a text data obtaining section configured to obtain text data on the basis of the input by the user using the natural language.

The command processing apparatus also includes a syntax analyzing section configured to extract a command from the obtained text data, the user wanting to carry out the command.

The command processing apparatus also includes a command analyzing section configured to generate a primitive type command from the command extracted by the syntax analyzing section.

The command processing apparatus also includes a specific viewpoint information obtaining section configured to obtain specific viewpoint information at least at a time of an input operation by the user using the natural language, the specific viewpoint information indicating a specific viewpoint in the virtual space.

The command processing apparatus also includes a command evaluating section configured to evaluate, in a case where the primitive type command generated by the command analyzing section includes a plurality of choices, each of the choices on the basis of a predetermined evaluation standard to output an evaluation result.

The command processing apparatus also includes a command determining section configured to determine a choice on the basis of the evaluation result by the command evaluating section to determine a command.

In this case, the command evaluating section is configured to evaluate each of the choices in the primitive type command by using the specific viewpoint information obtained by the specific viewpoint information obtaining section.

According to still another non-limiting aspect of the present invention, there is provided a command processing method of generating a command for carrying out an indication against an operation target in a virtual space on the basis of an input by a user using a natural language.

The command processing method includes a text data obtaining process configured to obtain text data on the basis of the input by the user using the natural language.

The command processing method also includes a syntax analyzing process configured to extract a command from the obtained text data, the user wanting to carry out the command.

The command processing method also includes a command analyzing process configured to generate a primitive type command from the command extracted in the syntax analyzing process.

The command processing method also includes a specific viewpoint information obtaining process configured to obtain specific viewpoint information at least at a time of an input operation by the user using the natural language, the specific viewpoint information indicating a specific viewpoint in the virtual space.

The command processing method also includes a command evaluating process configured to evaluate, in a case where the primitive type command generated in the command analyzing process includes a plurality of choices, each of the choices on the basis of a predetermined evaluation standard to output an evaluation result.

The command processing method also includes a command determining process configured to determine a choice on the basis of the evaluation result in the command evaluating process to determine a command.

In this case, the command evaluating process is configured to evaluate each of the choices in the primitive type command by using the specific viewpoint information obtained in the specific viewpoint information obtaining process.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like did not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like did not occur in the content of the processing.

First Embodiment

Figure 1:
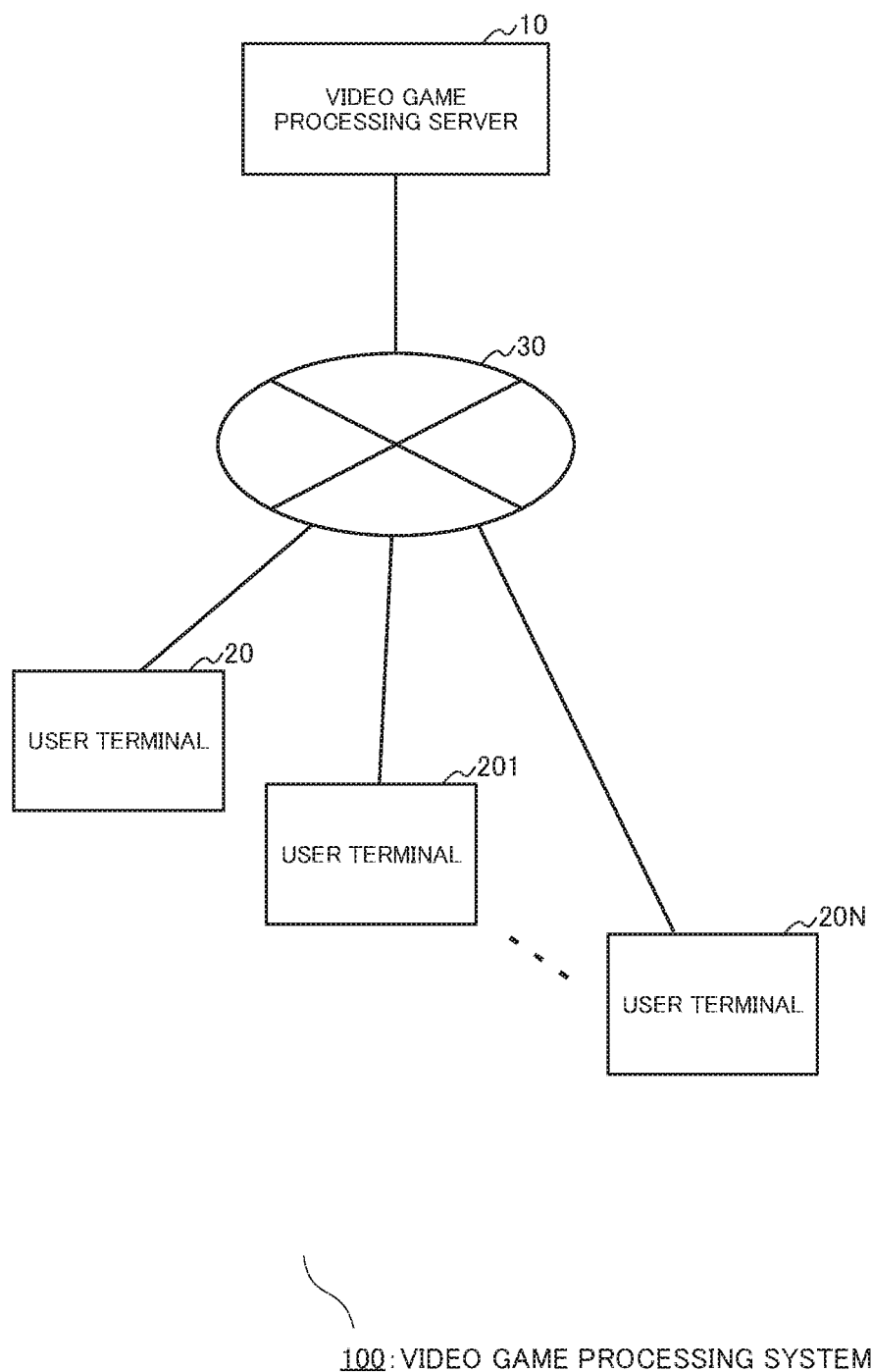
FIG. 1 is a block diagram showing an example of a configuration of a video game processing system corresponding to at least one of embodiments according to the present invention.

Hereinafter, a video game processing system 100 provided with functions as a command processing apparatus according to one embodiment of the present invention will be described. FIG. 1 is a block diagram showing an example of a configuration of the video game processing system 100 according to one embodiment of the present invention. As shown in FIG. 1, the video game processing system 100 includes a video game processing server 10 (hereinafter, referred to as a "server 10") and user terminals 20 and 201 to 20N ("N" is an arbitrary integer) respectively used by users of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10A and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The video game processing system 100 includes the server 10A and the plurality of user terminals 20 and 201 to 20N, whereby various kinds of functions for carrying out various kinds of processing in response to an operation of the user are realized.

The server 10 is managed by an administrator of the video game processing system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processing as a computer, such as a control section and a communicating section. However, its explanation herein is omitted. Further, in the video game processing system 100, it is preferable that the server 10 manages various kinds of information from a point of view to reduce a processing load on each of the plurality of user terminals 20 and 201 to 20N. However, a storing section for storing various kinds of information may include a storage region in a state where the server 100 can access the storage region. For example, the server 10 may be configured so as to be provided with a dedicated storage region outside the server 10.

Each of the plurality of user terminals 20, 201 to 20N is managed by a user, and is configured by a communication terminal, such as a cellular phone terminal, a PDA (Personal Digital Assistants), a mobile game device, and a so-called wearable divide, by which the user can play a network delivery type game, for example. In this regard, a configuration of the user terminal that the video game processing system 100 can include is not limited to the examples described above. It may be a configuration in which the user can recognize a video game. As other examples of the user terminal, there is a combination of a so-called wearable device, such as a smart watch, and a communication terminal or the like configured to communicate with the wearable device.

Further, each of the plurality of user terminals 20, 201 to 20N is connected to the communication network 30, and includes hardware (for example, a display device for displaying a browser screen and a game screen according to a coordinate and the like) and software for carrying out various kinds of processing by communicating with the server 10. In this regard, each of the plurality of user terminals 20, 201 to 20N may be configured so as to be capable of directly communicating with each other without the server 10.

In a stage to carry out game processing of the video game, the server 10 transmits a process stage to the user terminal 20 appropriately. The user terminal 20 causes a display device to display a game screen based on the content of the received process stage on a display screen. Generation of the game screen may be carried out at the server 10 side, or it may be carried out at the user terminal 20 side.

Here, the game screen means a screen that shows a virtual space (or a game space). In this regard, in the present embodiment, various kinds of elements that constitute a game screen may be referred to as an "image". The configuration of the game screen is not limited particularly so long as the user can recognize a status of the video game.

Further, the phrase "cause the display device to display the game screen on the display screen" means that the display device included in the user terminal 20 or the like is caused to output the game screen by means of communication using the communication network 30. As an example of the configuration to cause the display device to display the game screen, there is a configuration in which information generated at the server 10 side (hereinafter, referred to as "output information") is transmitted to a user terminal side. In this regard, the configuration of the output information is not limited particularly. The output information may be information in which an image is compressed, or information for causing the terminal side to generate an image, for example. As an example of the information in which the image is compressed, there is one used in a cloud game (for example, MPEG). Further, as information for generating an image at the terminal side, there is one used in an online game (for example, positional information of an object).

Figure 2:
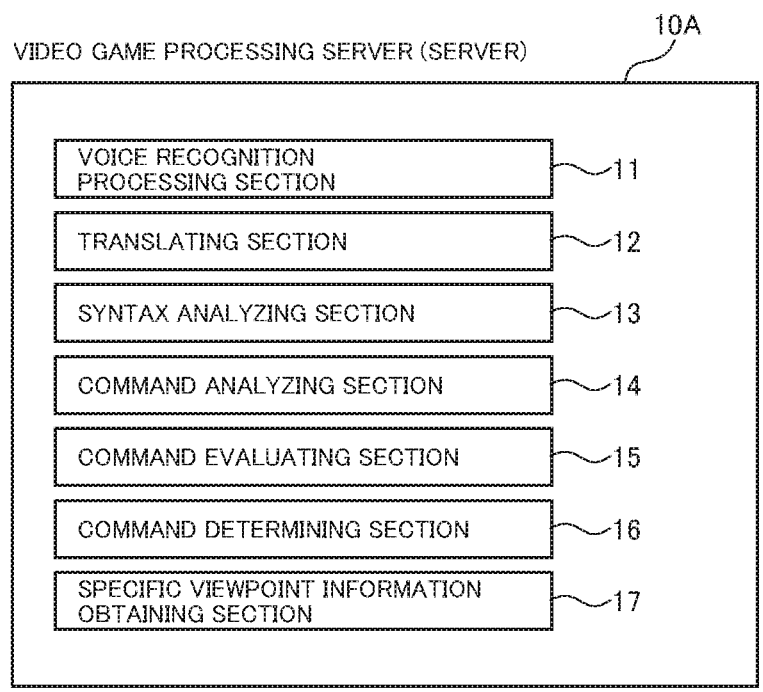
FIG. 2 is a block diagram showing a configuration of a video game processing server corresponding to at least one of the embodiments according to the present invention.

FIG. 2 is a block diagram showing a configuration of a video game processing server (hereinafter, referred to as a "server 10A"), which is an example of the configuration of the server 10. As shown in FIG. 2, the server 10A at least includes a voice recognition processing section 11, a translating section 12, a syntax analyzing section 13, a command analyzing section 14, a command evaluating section 15, a command determining section 16, and a specific viewpoint information obtaining section 17.

The voice recognition processing section 11 has a function to carry out voice recognition processing in which a sentence of natural language, which is contained in a voice input of the user, is converted into text data. This voice recognition processing by the voice recognition processing section 11 is carried out by large vocabulary continuous speech recognition (LVCSR), for example. Various kinds of large vocabulary continuous speech recognition engines have already been proposed. Thus, it is possible to adopt any known large vocabulary continuous speech recognition engine.

The translating section 12 has a function to translate the input by the user, which is converted into the text data by the voice recognition processing section 11, into language that can be associated with a command to be carried out in a program that is an instruction executing subject. For example, in a case where a voice input is carried out by Japanese and the program as the instruction executing subject determines a command on the basis of English, it is necessary to translate text data in Japanese into text data in English. In this regard, in a case where the voice input is carried out by language that can be associated with a command by means of the program as the instruction executing subject, it is not required to function this translating section 12.

The syntax analyzing section 13 has a function to analyze each single word and syntax (or construction of a sentence) of the text data after the translation by the translating section 12 (or the text data directly obtained from the voice recognition processing section 11 in the case of language that is not required to be translated), and to extract a command against the instruction executing subject. Specifically, the syntax analyzing section 13 analyzes the text data; classifies them into any of a command (Command: verb), an object (Object: noun), predicate (Predicates: adjective), negation (Negation: a negative expression such as "not"), a location (Location: an expression indicating a location such as "up", "left", "right", "up", "down", and "down"), an absolute location (AbsoluteLocation: an expression indicating an absolute location such as "here", "there", "over there", and "that place"), an absolute object (AbsoluteObject: an expression indicating an absolute object such as "this", "it", "so", "this", and "that"), absolute determination (AbsoluteDetermination: an expression indicting absolute determination such as "this", "its", "that", "This <noun>", and "That <noun>"), a descriptor (Descriptor: a descriptive expression such as "namely" and "a certain"), a preposition (Preposition: a preposition such as "then" and "after"), and the like; and extracts a command against the instruction executing subject. Namely, the syntax analyzing section 13 extracts a command expressed in form of a verb, an object expressed in form of a noun, information on locations such as a location of the object and the like, and extracts concrete instruction content.

Further, the server 10A may be configured so that: a vocabulary database in which nouns, verbs, adjectives, adverbs and the like are grouped into sets, which are very likely to be recognized as an equivalent word (or a synonym), is created and stored in advance in the syntax analyzing section 13; and an equivalent word corresponding to an object specified by text data is read out from the vocabulary database to extract a command so as to be applied to the object. For example, in a case where the user uses an expression "lighting device" in a situation that only a lamp exists in virtual space as objects corresponding to a lighting device, the server 10A is configured so as to: refer to the vocabulary database; and, in a case where the "lighting device" and the "lamp" are classified as the equivalent word, extract a command as the command extracted by the syntax analyzing section 13 by replacing the "lighting device" with the "lamp".

The command analyzing section 14 has a function to analyze the command extracted by the syntax analyzing section 13, and generate a primitive type command. Here, the primitive type command means a command that contains one processing element at the time of arithmetic processing. For example, a command "put an apple on a table" is realized by in series carrying out a plurality of primitive type commands "look for an apple", "move toward a location of the apple", "grasp the apple", "look for a table", "move toward a location of the table", and "put the apple on the table". In this manner, the command analyzing section 14 further analyzes the command extracted by the syntax analyzing section 13, and generates the primitive type commands.

The command evaluating section 15 has a function to evaluate, in a case where a plurality of candidates is thought for an object, which location is selected with respect to a location or the like in each of the primitive type commands generated by the command analyzing section 14 as the location closest to a user's wish. As an evaluating method, various methods may be adopted. For example, a primitive type command may be expressed with a tree structure by means of behavior trees (Behavior Trees), and an evaluation standard in which an optimal choice can be selected when a plurality of choices exists in the same layer may be provided. Further, a point (or a score) may be calculated and evaluated on the basis of an evaluating method in which usefulness (Utility) when each of choices is selected is defined in advance by means of utility-based artificial intelligence (Utility-based AI). Further, evaluation of a choice may be carried out on the basis of a learning model in which when to evaluate which choice is to be selected, information such as a current location of an operation target, the latest instruction content, and the latest operation object is used to learn which choice is to be selected as a correct answer in accordance with a situation. Further, convenience of the user may be heightened by appropriately giving correct answers to the learning model by the user to learn a habit and the like of the input from the user and reflecting a taste of the user.

Further, the command evaluating section 15 has a function to use specific viewpoint information obtained by the specific viewpoint information obtaining section 17 (will be described later) for evaluation of the choice such as an object in a primitive type command, and a location. Here, the specific viewpoint information means a viewpoint direction of the user or a character that can be changed in the virtual space, such as a direction of a camera angle that indicates a viewpoint direction of the user, a viewpoint direction of the character as an operation target, a viewpoint direction of a non-player character controlled by a computer. Further, information having directivity such as information on a direction pointed out by a hand that is expressed in the virtual space may be contained in addition to the viewpoint information. As a method of using the specific viewpoint information for evaluation of the choice, for example, a method is thought in which, in a case where the user expresses "that apple" in the video game where a game screen is a screen configuration like the FPS in which a state from a viewpoint of the user is expressed and a plurality of apples as choices exists in the virtual space, information on a distance between the user and any apple of them is an evaluation item, but evaluation of the apple that exists in the viewpoint direction of the user is heightened because it is high possibility to choice the apple. In particular, in the case of a video game that the user plays while wearing a goggle type of display device for VR (virtual reality), an image that expresses a state that the user actually confirms his or her surroundings by wrenching his or her head around is displayed. For this reason, it is necessary to evaluate an object that exists in the viewpoint direction so as to become a very likely choice.

The command determining section 16 has a function to determine a command against the instruction executing subject on the basis of an evaluation result of the command evaluating section 15. In a case where branches of a plurality of choices exist, the command determining section 16 determines a command of the most likely choice, and outputs the command against the instruction executing subject, whereby the processing is started. In this regard, in a case where a plurality of candidates for the object or the location does not exist in the primitive type command analyzed and generated by the command analyzing section 14 and it can be determined uniquely, the command evaluating section 15 does not carry out the evaluation and the command determining section 16 outputs the primitive type command generated by the command analyzing section 14 as it is, whereby the processing is started.

The specific viewpoint information obtaining section 17 has a function to obtain information on the viewpoint direction of the user or the character who or that can change the viewpoint direction in the virtual space. As the specific viewpoint information, a direction of the camera angle that indicates the viewpoint direction of the user, the viewpoint direction of the character as the operation target, the viewpoint direction of the non-player character, and the like are cited, for example. Further, the information having directivity such as information on the direction pointed out by the hand that is expressed in the virtual space may be contained in addition to the viewpoint information.

Obtaining of the specific viewpoint information may be carried out at any time, or may be carried out when the user carries out a voice input. However, when the specific viewpoint information is obtained, the specific viewpoint information obtaining section 17 also obtains time information when to obtain the specific viewpoint information together with the specific viewpoint information. For example, when an instruction "Put this apple on that table" is inputted with a voice, the specific viewpoint information obtaining section 17 obtains specific viewpoint information when to produce a sound "this apple" and specific viewpoint information when to produce a sound "on that table" together with time information of each of the specific viewpoint information, and also obtains the time information at the same time when to receive the voice input. Since such information is obtained, even though the instruction is an ambiguous expression "Put this apple on that table", it becomes possible to carry out the instruction by using the specific viewpoint information and the time information as a specific reason of the object. Namely, the specific viewpoint information obtaining section 17 specifies, on the basis of the time information, a time when each element converted into a text by the voice recognition processing, such as a single word and an idiomatic phrase (idiom), is produced as a sound, and combines it with the specific viewpoint information in the same time, whereby it becomes possible to specify the object even from the ambiguous expression.

Figure 3:
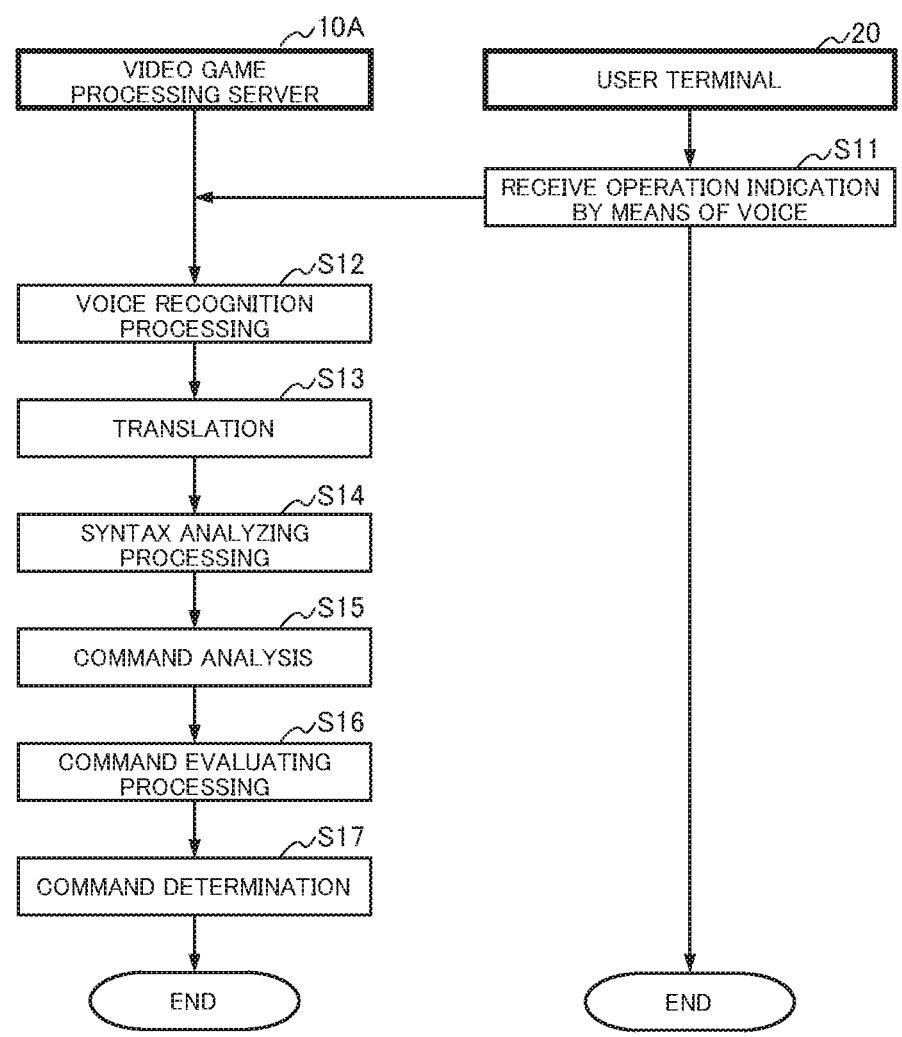
FIG. 3 is a flowchart showing an example of game processing corresponding to at least one of the embodiments according to the present invention.

FIG. 3 is a flowchart showing an example of game processing carried out by the video game processing system 100. Hereinafter, the case where the server 10A and the user terminal 20 (terminal 20) carry out the game processing will be described as an example.

The game processing is started in a state that an instruction can be inputted with a voice for a character (operation target) that is an instruction executing subject on a virtual space, for example. For example, when an operation indication by voice is made in the user terminal 20 after the game processing is started, the user terminal 20 obtains the voice input, and transmits data of the voice input to the server 10A (Step S11). The server 10A carries out the voice recognition processing for the obtained voice input data to obtain text data obtained by converting the voice into a text (Step S12). The server 10A translates the text data into language that can be associated with a command to be carried out (Step S13). The server 10A carries out syntax analyzing processing for the text data after the translation to extract a command that expresses instruction content (Step S14). The server 10A carries out command analyzing process, thereby generating a primitive type command from the command extracted by the syntax analyzing processing (Step S15). In a case where a plurality of choices is included in the primitive type command, the server 10A evaluates each of the choices in command evaluating processing and outputs an evaluation result (Step S16). In the command evaluating processing, specific viewpoint information is also used for the evaluation of the choice. The server 10A then determines a command against the character, which is the instruction executing subject, on the basis of the evaluation result; outputs the determined command (Step S17); and terminates the processing. Then, the server 10A causes the character that is the instruction executing subject to carry out a process based on the determined command.

Figure 4:
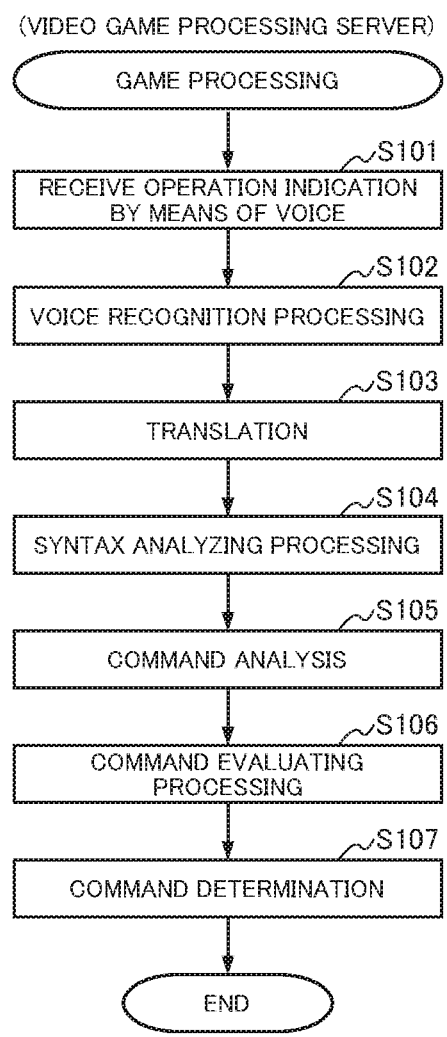
FIG. 4 is a flowchart showing an example of an operation of a server side in the game processing corresponding to at least one of the embodiments according to the present invention.

FIG. 4 is a flowchart showing an example of an operation of the server 10A side in the game processing. Here, an operation of the server 10A in the video game processing system 100 will be described.

When an operation indication by voice is made, the server 10A obtains the voice input as voice input data (Step S101). The server 10A carries out the voice recognition processing for the obtained voice input data to obtain text data obtained by converting the voice into a text (Step S102). The server 10A translates the text data into language that can be associated with a command to be carried out (Step S103). The server 10A carries out syntax analyzing processing for the text data after the translation to extract a command that expresses instruction content (Step S104). The server 10A carries out command analyzing process, thereby generating a primitive type command from the command extracted by the syntax analyzing processing (Step S105). In a case where a plurality of choices is included in the primitive type command, the server 10A evaluates each of the choices in command evaluating processing and outputs an evaluation result (Step S106). In the command evaluating processing, specific viewpoint information is also used for the evaluation of the choice. The server 10A then determines a command against the character, which is the instruction executing subject, on the basis of the evaluation result; outputs the determined command (Step S107); and terminates the processing.

Figure 5:
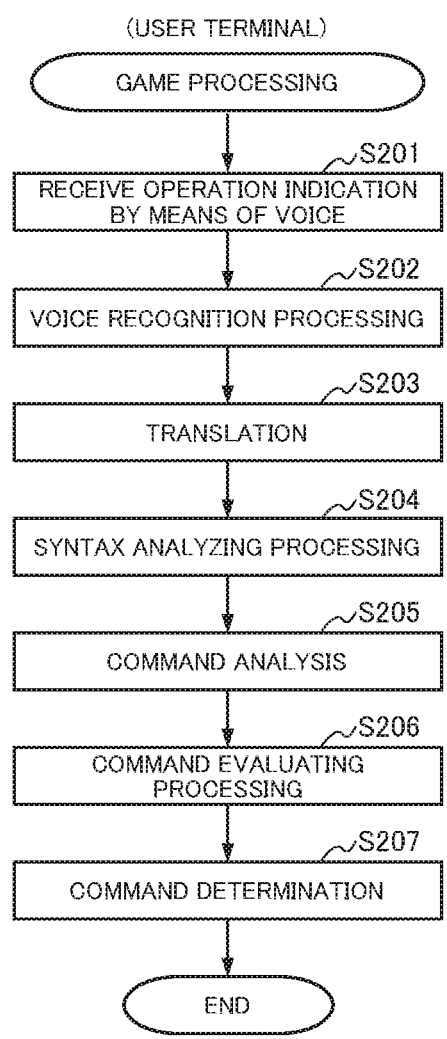
FIG. 5 is a flowchart showing an example of an operation of a user terminal side in the game processing corresponding to at least one of the embodiments according to the present invention.

FIG. 5 is a flowchart showing an example of an operation of the user terminal 20 side in a case where the user terminal 20 carries out the game processing. Hereinafter, the case where the user terminal 20 carries out the game processing by a single body will be described as an example. In this regard, the user terminal 20 is configured to similar functions to those of the server 10 except for a function to receive various kinds of information from the server 10. For this reason, its description will be omitted from a point of view to avoid repeated explanation.

When an operation indication by voice is made, the user terminal 20 obtains the voice input as voice input data (Step S201). The user terminal 20 carries out the voice recognition processing for the obtained voice input data to obtain text data obtained by converting the voice into a text (Step S202). The user terminal 20 translates the text data into language that can be associated with a command to be carried out (Step S203). The user terminal 20 carries out syntax analyzing processing for the text data after the translation to extract a command that expresses instruction content (Step S204). The user terminal 20 carries out command analyzing process, thereby generating a primitive type command from the command extracted by the syntax analyzing processing (Step S205). In a case where a plurality of choices is included in the primitive type command, the user terminal 20 evaluates each of the choices in command evaluating processing and outputs an evaluation result (Step S206). In the command evaluating processing, specific viewpoint information is also used for the evaluation of the choice. The user terminal 20 then determines a command against the character, which is the instruction executing subject, on the basis of the evaluation result; outputs the determined command (Step S207); and terminates the processing.

Figure 6:
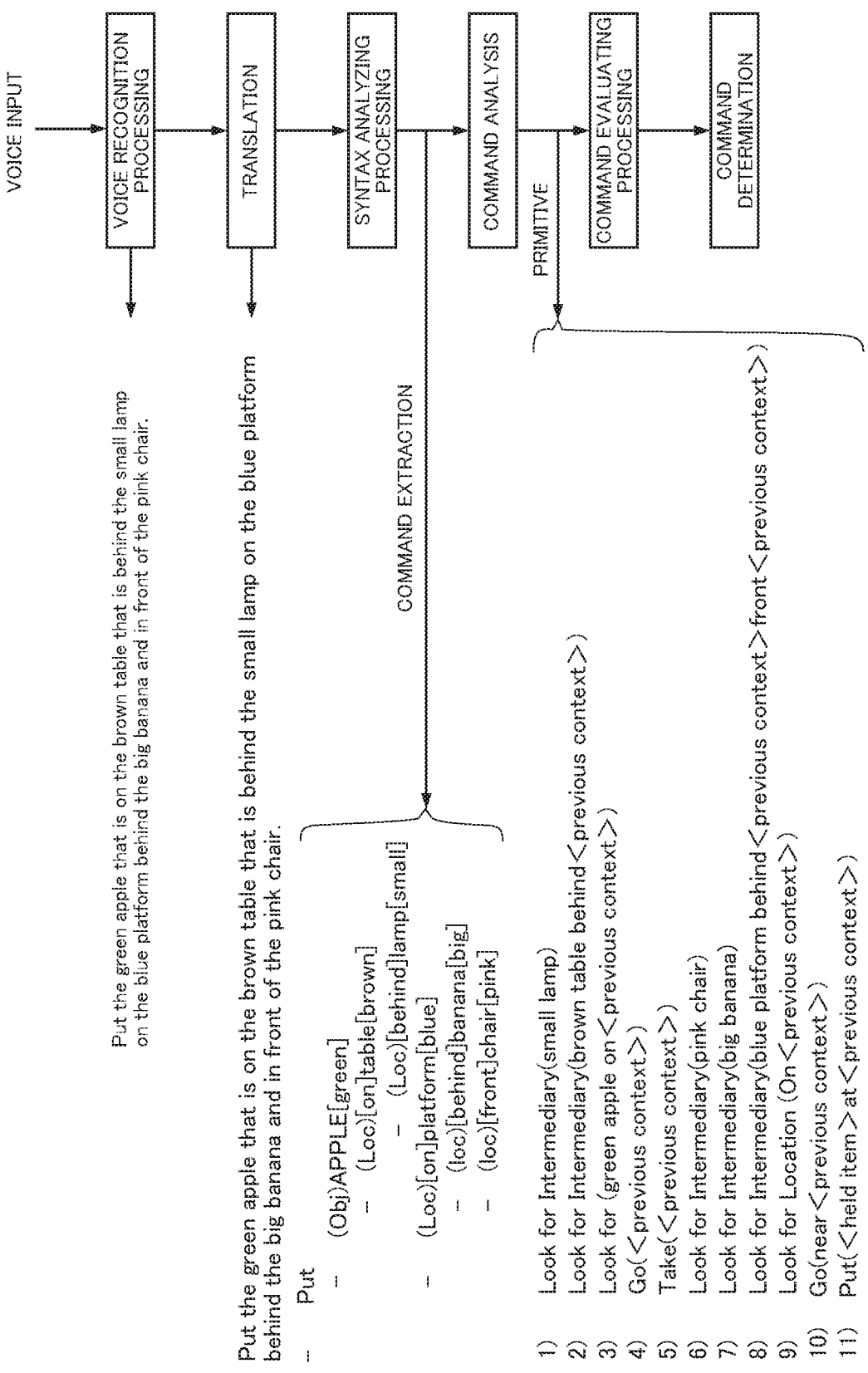
FIG. 6 is an explanatory drawing for explaining processing in a case where each of processes from a process voice input to command determination is carried out in the video game processing system corresponding to at least one of the embodiments according to the present invention.

FIG. 6 is an explanatory drawing for explaining processing in a case where each of processes from a process voice input to command determination is carried out in the video game processing system corresponding to at least one of the embodiments according to the present invention. When a user first carries out a voice input by producing a sound of "Put the green apple that is on the brown table that is behind the small lamp on the blue platform behind the big banana and in front of a pink chair." (input with Japanese) to a microphone, text data with the same content is generated by voice recognition processing. Further, as one example, in a case where language that can be associated with the command to be carried out is English, the text data described above by Japanese is translated into English text data like "Put the green apple that is on the brown table that is behind the small lamp on the blue platform behind the big banana and in front of the pink chair."

Next, the syntax analyzing processing for the text data in English is carried out, and the command to be carried out is extracted. As shown in FIG. 6, it is extracted that the command is "put"; it is extracted that the object is the "apple [green]"; it is extracted that the location of the object is "[on] table [brown], [behind] lamp [small]"; and it is extracted that the location at which the object is "put" (that is, a target of "put") is "[on] platform[blue], [behind] banana [big], [front] chair [pink]".

Primitive type commands are generated by the command analyzing process from the command extracted by the syntax analyzing processing. In FIG. 6, the primitive type commands consisting of eleven steps are generated. Then, the command evaluating processing for the generated primitive type commands is carried out. In a case where a plurality of choices exists in the object in the primitive type commands, evaluation about selection of each of the choices is carried out. When to evaluate it, the viewpoint information of the user is also used as the specific viewpoint information. For this reason, when to specify the object on the basis of an expression "behind the small lamp" and an expression "in front of the pink chair", it becomes possible to evaluate the choice of the object by using a positional relationship when viewed from the viewpoint of the user.

Figure 7:
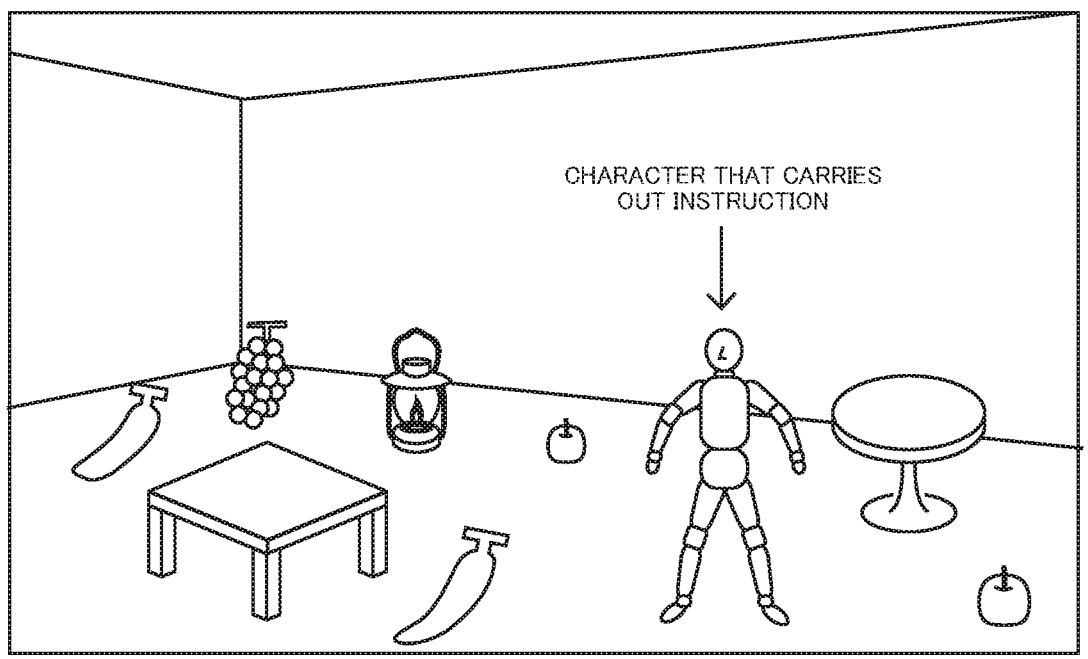
FIG. 7 is a screen view showing one example of a game screen in the game processing corresponding to at least one of the embodiments according to the present invention.

FIG. 7 is a screen view showing one example of a game screen in the game processing corresponding to at least one of the embodiments according to the present invention. FIG. 7 shows a game screen that supposes a video game in which a character that carries out an instruction of a user is arranged in a three-dimensional virtual space, and this character is caused to carry out various kinds of operations by means of voice inputs to clear tasks. Further, the game screen shown in FIG. 7 is a game screen that is composed of a configuration of a user's viewpoint like the FPS. In this situation of the game screen shown in FIG. 7, for example, the user inputs an instruction "put this apple on that table" with his or her voice. Since two apples exist and two tables also exist, it is impossible to uniquely specify an object and a target location only on the basis of this instruction. However, at timing of a voice input, viewpoint information of the user when to produce a sound "this apple" is a situation of the game screen shown in FIG. 7; viewpoint information of the user when to produce a sound "on that table" is a viewpoint direction toward a square table; these pieces of the specific viewpoint information are respectively obtained together with time information; and time information when to obtain the voice input is also obtained at the same time. By adding the specific viewpoint information to specific evaluation of the choice in this manner, it is possible to select a command combined with the choices "put the apple positioned in front at the time of the viewpoint information shown in FIG. 7 on the square table even though the instruction is an instruction of ambiguous expression "put this apple on that table". In this regard, various settings can be made to what extent the specific viewpoint information is reflected to the evaluation of the command. The server 10A may be configured so that the specific viewpoint information is evaluated as very high priority, or the specific viewpoint information is evaluated only as a guide. Thus, it is possible to appropriately set the specific viewpoint information in accordance with a request and the like of the video game.

As the video game in which the character that carries out the instruction of the user is arranged in the virtual space and this character is caused to carry out various kinds of operations by the voice input as shown in FIG. 7, a puzzle game and the like that are carried out in a three-dimensional virtual space are thought, for example. In a puzzle game in which various tasks on the three-dimensional virtual space, such as opening or closing of a door, on or off of a switch, movement of an object, and specification of a moving destination of a character are processed to clear the puzzle game, by applying the command processing according to the present embodiment thereto, it is possible to realize a puzzle game in which an instruction against the operation target is realized by means of a voice input that is closer to a conversation.

As explained above, as one side of the first embodiment, the server 10A provided with the functions as the command processing apparatus that includes the functions to generate a command for carrying out an indication to the operation target in the virtual space on the basis of the input by the natural language from the user is configured so as to include the voice recognition processing section 11, the translating section 12, the syntax analyzing section 13, the command analyzing section 14, the command evaluating section 15, the command determining section 16, and the specific viewpoint information obtaining section 17. Thus, the server 10A obtains the text data on the basis of the input by the user using the natural language; the syntax analyzing section 13 extracts the command from the obtained text data, the user wanting to cause the character to carry out the command; the command analyzing section 14 generates the primitive type command from the extracted command; the specific viewpoint information obtaining section 17 obtains the specific viewpoint information at least at the time of the input operation by the user using the natural language, the specific viewpoint information indicating a specific viewpoint in the virtual space; the command evaluating section 15 evaluates, in a case where the generated primitive type command includes a plurality of choices, each of the choices on the basis of the predetermined evaluation standard to output an evaluation result; the command determining section 16 determines the choice on the basis of the evaluation result to determine the command; and the command evaluating section 15 evaluates each of the choices in the primitive type command by using the obtained specific viewpoint information when to evaluate the command. Therefore, it is possible to appropriately carry out command processing even though the voice input is carried out with a feeling of daily conversation in which ambiguous expressions are contained.

Namely, in a case where a voice input is carried out with a feeling of daily conversation containing ambiguous expressions, there is a probability that an object that a command deals with cannot be uniquely specified. However, the specific viewpoint information containing the viewpoint information of user and the like is used as information for selecting an optimal choice from among a plurality of choices. For this reason, by adding the specific viewpoint information to the ambiguous expression to provide the functions to evaluate the choices, it is possible to select the optimal choice even in the case of the ambiguous expression.

In this regard, in the first embodiment, the case where the user carries out the voice input that is inputted by the voice has been explained as an example. However, even in a case where the user directly inputs a text on the basis of a keyboard or the like, it is possible to demonstrate the similar effects. In that case, the voice recognition processing section 11 shown in FIG. 2 may be replaced by a text data obtaining section that obtains text data in a broad sense regardless of whether the text data is generated from the voice data or obtained directly from the user and other elements (or components) may have the similar functions. This makes it possible to obtain the similar effects to those of the first embodiment. Namely, even in the case of a direct input of text data containing an ambiguous expression close to a conversation, it becomes possible to carry out the command processing by appropriately specifying an object.

As explained above, one or two or more shortages can be solved by each of the embodiments of the present application. In this regard, the effects according to each of the embodiments are non-limiting effects or one example of the non-limiting effects.

In this regard, in each of the embodiments described above, each of the plurality of user terminals 20 and 201 to 20N and the server 100 carries out the various kinds of processing described above in accordance with various kinds of control programs (for example, a video game processing program) stored in the storage device with which the corresponding terminal or server is provided.

Further, a configuration of the system 100 is limited to the configuration that has been explained as an example of each of the embodiments described above. For example, the system 100 may be configured so that part or all of the processing that has been explained as the processing carried out by the user terminal is carried out by the server 10, or it may be configured so that part or all of the processing that has been explained as the processing carried out by the server 10 is carried out by any of the plurality of user terminals 20 and 201 to 20N (for example, the user terminal 20). Further, the system 100 may be configured so that a part or all of the storing sections included by the server 10 is included in any of the plurality of user terminals 20 and 201 to 20N. Namely, the system 100 may be configured so that a part or all of the functions included in any one of the user terminal 20 and the server 10A according to the system 100 is included in the other.

Further, the program may be configured so as to cause a single apparatus that does not include a communication network to realize a part or all of the functions that have been explained as the examples of the respective embodiments described above.

In this regard, the word "in accordance with progress of the video game" means that occurrence of various kinds of progress or changes and the like that can be generated in the video game becomes timing or a standard of a specific process. As examples of the specific process, there are a determining process, an information updating process, and the like. Further, as examples of the various kinds of progress or changes that can be generated in the video game, there are progress of time, a change in a game element value, a specific status or update of a flag, an operation input by the user, and the like.

According to one of the embodiments of the present invention, it is useful to realize an instruction against an operation target in a virtual space by means of a voice input that is closer to a conversation.

What is claimed is:

1. A non-transitory computer-readable medium including a command processing program for causing a computer to generate a command for carrying out an indication against an operation target in a virtual space on a basis of an input by a user using a natural language, the command processing program, when executed, causing the computer to perform operations comprising:
   recognizing, by voice recognition, a voice input of the user as a voice of the user;
   obtaining text data based on the voice input of the user using the natural language;
   extracting a command from the obtained text data, the user wanting to carry out the command;
   generating a primitive type command from the extracted command;
   obtaining specific viewpoint information at least at a time of the voice input of the user using the natural language, the specific viewpoint information indicating a specific viewpoint in the virtual space;
   evaluating, in a case where the primitive type command includes a plurality of choices, each of the plurality of choices based on a predetermined evaluation standard to output an evaluation result; and
   determining a choice based on the evaluation result of each of the plurality of choices to determine the command,
   wherein, in the evaluating, each of the plurality of choices is evaluated in the primitive type command by using the specific viewpoint information.

2. The non-transitory computer-readable medium according to claim 1, wherein the specific viewpoint information is obtained from a virtual reality device that the user is wearing.

3. The non-transitory computer-readable medium according to claim 1, the operations further comprising:
   obtaining time information when the voice of the user is input; and
   obtaining time information when the specific viewpoint information is obtained,
   wherein, in the evaluating, each of the plurality of choices is evaluated in the primitive type command so that a time when to produce each element of the text data, obtained based on the voice input of the user, is combined with the specific viewpoint information at a same time.

4. The non-transitory computer-readable medium according to claim 1, wherein the specific viewpoint information corresponds to a directivity of a predetermined part of a player character in the virtual space.

5. A command processing method of generating a command for carrying out an indication against an operation target in a virtual space on a basis of an input by a user using a natural language, the command processing method comprising:
   recognizing, by voice recognition, a voice input of the user as a voice of the user;

obtaining text data based on the voice input of the user using the natural language;

extracting a command from the obtained text data, the user wanting to carry out the command;

generating a primitive type command from the extracted command;

obtaining specific viewpoint information at least at a time of the voice input of the user using the natural language, the specific viewpoint information indicating a specific viewpoint in the virtual space;

evaluating, in a case where the primitive type command includes a plurality of choices, each of the plurality of choices based on a predetermined evaluation standard to output an evaluation result; and determining, by a computer, a choice based on the evaluation result of each of the plurality of choices to determine the command, wherein, in the evaluating, each of the plurality of choices is evaluated in the primitive type command by using the specific viewpoint information.

6. The command processing method according to claim 5, wherein the specific viewpoint information corresponds to a directivity of a predetermined part of a player character in the virtual space.

7. The command processing method according to claim 5, wherein the specific viewpoint information is obtained from a virtual reality device that the user is wearing.

8. A command processing apparatus configured to generate a command for carrying out an indication against an operation target in a virtual space on a basis of an input by a user using a natural language, the command processing apparatus comprising:

a microphone; and a memory including at least one program that, when executed by the command processing apparatus, causes the command processing apparatus to perform operations including:

recognizing, by voice recognition, a voice input of the user as a voice of the user, the voice input of the user being input to the microphone;

obtaining text data based on the voice input of the user using the natural language;

extracting a command from the obtained text data, the user wanting to carry out the command;

generating a primitive type command from the extracted command;

obtaining specific viewpoint information at least at a time of the voice input of the user using the natural language, the specific viewpoint information indicating a specific viewpoint in the virtual space;

evaluating, in a case where the primitive type command includes a plurality of choices, each of the plurality of choices based on a predetermined evaluation standard to output an evaluation result; and determining a choice based on the evaluation result to determine the command, wherein, in the evaluating, each of the plurality of choices is evaluated in the primitive type command by using the specific viewpoint information.

9. The command processing apparatus according to claim 8, wherein the specific viewpoint information is obtained from a virtual reality device that the user is wearing.

10. The command processing apparatus according to claim 8, wherein the specific viewpoint information corresponds to a directivity of a predetermined part of a player character in the virtual space.

* * * * *